US010706119B1

United States Patent
Yellin et al.

(10) Patent No.: US 10,706,119 B1
(45) Date of Patent: Jul. 7, 2020

(54) CONTENT PREFETCHING TO USER DEVICES BASED ON RENDERING CHARACTERISTICS

(71) Applicant: Tensera Networks Ltd., Adanim (IL)

(72) Inventors: Daniel Yellin, Raanana (IL); David Ben Eli, Modiin (IL); Eilon Regev, Givatayim (IL); Shimon Moshavi, Beit Shemesh (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 186 days.

(21) Appl. No.: 16/010,561

(22) Filed: Jun. 18, 2018

Related U.S. Application Data (63) Continuation-in-part of application No. 15/613,222, filed on Jun. 4, 2017, which is a continuation-in-part of application No. 15/092,638, filed on Apr. 7, 2016, now Pat. No. 9,723,470.

(60) Provisional application No. 62/154,823, filed on Apr. 30, 2015, provisional application No. 62/274,319, filed on Jan. 3, 2016, provisional application No. 62/293,343, filed on Feb. 10, 2016, provisional application No. 62/383,431, filed on Sep. 4, 2016, provisional application No. 62/436,458, filed on Dec. 20, 2016, provisional application No. 62/436,459, filed on Dec. 20, 2016, provisional application No.
(Continued)

(51) Int. Cl.
*G06F 17/00* (2019.01)
*G06F 16/957* (2019.01)
*H04L 29/08* (2006.01)
*G06F 16/28* (2019.01)

(52) U.S. Cl.
CPC ........ *G06F 16/9574* (2019.01); *G06F 16/287* (2019.01); *H04L 67/2847* (2013.01)

(58) Field of Classification Search
CPC . G06F 16/9574; G06F 16/287; H04L 67/2847
See application file for complete search history.

(56) References Cited

U.S. PATENT DOCUMENTS 6,182,133 B1 * 1/2001 Horvitz ............... G06F 16/9574
709/223
6,553,409 B1 4/2003 Zhang et al.
(Continued)

OTHER PUBLICATIONS

U.S. Appl. No. 15/613,222 office action dated Nov. 18, 2019.
U.S. Appl. No. 15/613,222 office action dated Feb. 24, 2020.

*Primary Examiner* — Tyler J Torgrimson
(74) *Attorney, Agent, or Firm* — Kligler & Associates Patent Attorneys Ltd (57) ABSTRACT

An apparatus for content delivery includes a network interface and one or more processors. The network interface is configured for communicating over a communication network. The processors are configured to identify rendering characteristics of a plurality of content items that are to be displayed together as a User-Interface (UI) unit on a user device, to assign the content items to (i) a first subset including one or more content items that are to be prefetched, and (ii) a second subset including one or more content items that are not to be prefetched, to prefetch the content items of the first subset irrespective of any request from a user of the user device to access the UI unit, to fetch the content items of the second subset in response to a request from the user to access the UI unit, and to present the UI unit.

28 Claims, 3 Drawing Sheets

Related U.S. Application Data

62/436,464, filed on Dec. 20, 2016, provisional application No. 62/473,391, filed on Mar. 19, 2017, provisional application No. 62/487,497, filed on Apr. 20, 2017, provisional application No. 62/521,563, filed on Jun. 19, 2017, provisional application No. 62/572,494, filed on Oct. 15, 2017.

(56) References Cited

U.S. PATENT DOCUMENTS

| | | | |
|---|---|---|---|
| 6,854,018 B1* | 2/2005 | Li | H04L 67/2847 709/203 |
| 8,516,041 B1* | 8/2013 | Miles | H04L 67/2847 709/203 |
| 8,719,265 B1* | 5/2014 | Bedrax-Weiss | G06F 16/2455 707/736 |
| 8,812,658 B1* | 8/2014 | Teeraparpwong | G06F 3/0484 709/224 |
| 9,081,856 B1* | 7/2015 | Scott | G06F 16/748 |
| 9,769,030 B1* | 9/2017 | Ramalingam | H04L 67/02 |
| 10,013,498 B2* | 7/2018 | Chen | G06F 16/9574 |
| 2002/0147788 A1* | 10/2002 | Nguyen | G06F 16/9574 709/217 |
| 2003/0061449 A1* | 3/2003 | Beyda | G06F 16/9574 711/133 |
| 2003/0065737 A1* | 4/2003 | Aasman | G06F 16/9574 709/213 |
| 2003/0126232 A1 | 7/2003 | Mogul et al. | |
| 2004/0088375 A1 | 5/2004 | Sethi et al. | |
| 2006/0031778 A1 | 2/2006 | Goodwin et al. | |
| 2006/0253546 A1* | 11/2006 | Chang | G06F 16/9574 709/217 |
| 2006/0277271 A1 | 12/2006 | Morse et al. | |
| 2007/0033402 A1* | 2/2007 | Williams | G06Q 30/02 713/169 |
| 2008/0228772 A1* | 9/2008 | Plamondon | G06F 16/9574 |
| 2010/0332589 A1 | 12/2010 | Schwimer | |
| 2011/0029641 A1* | 2/2011 | Fainberg | G06F 12/0862 709/219 |
| 2011/0087842 A1* | 4/2011 | Lu | G06F 16/9535 711/126 |
| 2013/0019159 A1* | 1/2013 | Civelli | H04L 67/2847 715/234 |
| 2014/0136794 A1* | 5/2014 | Raman | G06F 16/9574 711/137 |
| 2014/0136952 A1* | 5/2014 | Zhu | G06F 40/14 715/234 |
| 2014/0136971 A1* | 5/2014 | Kumar | G06F 16/9574 715/273 |
| 2014/0351621 A1 | 11/2014 | Conroy et al. | |
| 2015/0186545 A1* | 7/2015 | Krutzler | G06F 3/04883 715/234 |
| 2015/0212655 A1* | 7/2015 | Koski | G06F 16/9574 715/730 |
| 2015/0254806 A1 | 9/2015 | Circlaeys et al. | |
| 2015/0341459 A1* | 11/2015 | Joel | H04L 67/2823 709/203 |
| 2016/0191651 A1* | 6/2016 | Balakrishnan | H04L 67/2895 709/219 |
| 2016/0191664 A1* | 6/2016 | Balakrishnan | H04L 67/306 709/203 |
| 2016/0306895 A1 | 10/2016 | Kaewell et al. | |
| 2017/0169031 A1* | 6/2017 | De Barros | H04L 67/02 |
| 2018/0295206 A1* | 10/2018 | Devaraju | H04L 67/2847 |
| 2019/0116239 A1* | 4/2019 | Jagannath | H04L 67/2847 |
| 2019/0230186 A1* | 7/2019 | Yellin | G06F 9/44505 |

* cited by examiner

CONTENT PREFETCHING TO USER DEVICES BASED ON RENDERING CHARACTERISTICS

CROSS-REFERENCE TO RELATED APPLICATIONS

The present application is a continuation-in-part of U.S. patent application Ser. No. 15/613,222, filed Jun. 4, 2017, which is a continuation-in-part of U.S. patent application Ser. No. 15/092,638, filed Apr. 7, 2016. U.S. patent application Ser. No. 15/613,222 claims the benefit of U.S. Provisional Patent Application 62/383,431, filed Sep. 4, 2016, U.S. Provisional Patent Application 62/436,458, filed Dec. 20, 2016, U.S. Provisional Patent Application 62/436,459, filed Dec. 20, 2016, U.S. Provisional Patent Application 62/436,464, filed Dec. 20, 2016, U.S. Provisional Patent Application 62/473,391, filed Mar. 19, 2017, and U.S. Provisional Patent Application 62/487,497, filed Apr. 20, 2017. The present application also claims the benefit of U.S. Provisional Patent Application 62/521,563, filed Jun. 19, 2017, and U.S. Provisional Patent Application 62/572,494, filed Oct. 15, 2017. The disclosures of all these related applications are incorporated herein by reference.

FIELD OF THE INVENTION

The present invention relates generally to communication systems, and particularly to methods and systems for prefetching content to user devices.

BACKGROUND OF THE INVENTION

Various techniques are known in the art for delivering content to wireless users. For example, U.S. Pat. No. 8,601,052 describes a method and system for performing content prefetching for a wireless portable computing device (PCD).

As another example, U.S. Patent Application Publication 2010/0161831 describes a content and traffic managing system. A mobile device is connectable to users and to content providers via communication links. The system tracks various parameters over time, and schedules communication in relation to predefined or projected content responsive to user content-related behavior, user communication behavior, user external behavior, and parameters of communication links.

U.S. Patent Application Publication 2016/0021211, whose disclosure is incorporated herein by reference, describes a method for content delivery that includes including defining a guaranteed prefetching mode, in which content is continuously prefetched from a content source to a communication terminal of a user so as to maintain the communication terminal synchronized with the content source. One or more time-of-day intervals, during which the user is expected to access given content, are identified. During the identified time-of-day intervals, the given content is prefetched from the content source to the communication terminal using the guaranteed prefetching mode.

SUMMARY OF THE INVENTION

An embodiment of the present invention that is described herein provides an apparatus including a network interface for communicating over a communication network, and one or more processors. The one or more processors are configured to estimate, for a user device, a usage level of one or more of data consumption and electrical power, to limit, based on the estimated usage level, an extent of content prefetching to the user device over the communication network, and to prefetch content to the user device while complying with the limited extent of content prefetching.

In some embodiments, the one or more processors are configured to limit the extent of content prefetching to a value that underutilizes both a cache size and a communication bandwidth available to the user device. In an embodiment, the one or more processors are configured to estimate the usage level of the user device with respect to an individual application running in the user device, or with respect to an individual content source accessed by the user device. In a disclosed embodiment, the one or more processors are configured to limit the extent of content prefetching with respect to an individual application running in the user device, or with respect to an individual content source accessed by the user device.

In another embodiment, the one or more processors are configured to limit the extent of content prefetching to a value that depends on one or more of: (i) remaining battery energy of the user device, (ii) a time remaining until a battery of the user device is predicted to be recharged, (iii) past device recharge frequency, and (iv) current device charging status. In still another embodiment, the one or more processors are configured to limit the extent of content prefetching to a value that depends on one or more of: (i) remaining data-transfer allowance of the user device and (ii) a time remaining until the data-transfer allowance is expected to be reset.

In an example embodiment, the one or more processors are configured to estimate the usage level over time intervals that depend on a billing cycle of the user device. Additionally or alternatively, the one or more processors may be configured to estimate the usage level over time intervals that depend on a most-recent time a battery of the user device was recharged.

In another embodiment, the communication network includes first and second networks, and the one or more processors are configured to limit the extent of content prefetching over the first network but not over the second network. In yet another embodiment, the communication network includes first and second networks, and the one or more processors are configured to limit the extent of content prefetching over the first network based on the estimated usage level over the first network, and limit the extent of content prefetching over the second network based on the estimated usage level over the second network. In an embodiment, the one or more processors are configured to limit the extent of content prefetching based on a monetary cost incurred by the user device.

There is additionally provided, in accordance with an embodiment of the present invention, an apparatus including a network interface for communicating over a communication network, and one or more processors. The one or more processors are configured to identify rendering characteristics of content items to be displayed on a user device, to specify, based on the rendering characteristics, a prefetch policy for prefetching one or more of the content items to the user device over the communication network, and to serve the content items to the user device in accordance with the prefetch policy.

In some embodiments, the rendering characteristics include a classification of the content items at least into textual and non-textual content items. In an embodiment, the one or more processors are configured to give preference to prefetching of textual content items over non-textual content items.

In another embodiment, the one or more processors are configured to give preference to prefetching of content items that are visible on the user device without scrolling. In yet another embodiment, the one or more processors are configured to give preference to prefetching of content items that are visible on the user device with up to a predefined amount of scrolling. In still another embodiment, the rendering characteristics include an order in which the content items are rendered.

In some embodiments, for a composite content item including multiple content components, the one or more processors are configured to specify the prefetch policy for prefetching one or more of the content components to the user device based on the rendering characteristics of the content components as part of the composite content item. In example embodiments, the composite content item includes a Web page or an application feed. In an embodiment, the one or more processors are configured to give preference to prefetching of content items that specify a structure of the composite content item.

In a disclosed embodiment, the rendering characteristics include an indication of whether asynchronous rendering is applied in rendering the content items.

There is further provided, in accordance with an embodiment of the present invention, a method including estimating, for a user device that communicates over a communication network, a usage level of one or more of data consumption and electrical power. An extent of content prefetching to the user device over the communication network is limited based on the estimated usage level. Content is prefetched to the user device while complying with the limited extent of content prefetching.

There is also provided, in accordance with an embodiment of the present invention, a method including identifying rendering characteristics of content items to be displayed on a user device that communicates over a communication network. A prefetch policy, for prefetching one or more of the content items to the user device over the communication network, is specified based on the rendering characteristics. The content items are served to the user device in accordance with the prefetch policy.

There is additionally provided, in accordance with an embodiment of the present invention, an apparatus for content delivery including a network interface and one or more processors. The network interface is configured for communicating over a communication network. The one or more processors are configured to identify rendering characteristics of a plurality of content items that are to be displayed together as a User-Interface (UI) unit on a user device, to assign the plurality of content items, based on the rendering characteristics, to (i) a first subset including one or more content items that are to be prefetched to the user device over the communication network, and (ii) a second subset including one or more content items that are not to be prefetched to the user device, to prefetch the content items of the first subset irrespective of any request from a user of the user device to access the UI unit, to fetch the content items of the second subset over the communication network only in response to a request from the user to access the UI unit, and to present the UI unit to the user, including both the prefetched first subset and the fetched second subset.

In some embodiments, the rendering characteristics include locations of the content items within the UI unit. In some embodiments, the rendering characteristics include locations of the content items relative to a portion of the UI unit that is currently displayed on a screen of the user device. In some embodiments, the processors are configured to assign to the content items, as the rendering characteristics, visibility metrics that are indicative of one or more of (i) respective time durations and (ii) respective amounts of user actions, needed to make the content items visible to the user. In an embodiment, the processors are configured to assess the visibility metrics relative to one or more of (i) absolute locations of the content items in the UI unit, (ii) a portion of the UI unit that is currently displayed on a screen of the user device, (iii) a launcher of the UI unit, (iv) a home screen of the launcher, and (v) a landing page of the UI unit. In another embodiment, the visibility metrics are binary, and are indicative of whether or not an amount of the needed user actions is lower than a predefined threshold.

In a disclosed embodiment, the rendering characteristics include rates at which updates are made to the content items. In another embodiment, the processors are configured to pre-render a portion of the UI unit associated with the content items in the first subset.

In some embodiments, the processors are configured to (i) initially present the UI unit to the user without an up-to-date version of at least one content item in the second subset, then (ii) fetch the up-to-date version over the communication network, and then (iii) update the UI unit being presented to include the up-to-date version. In an embodiment, the processors are configured to initially display a dummy placeholder content item in place of the up-to-date version. In an alternative embodiment, the processors are configured to present the UI unit to the user only after the content items of the second subset have been fetched over the communication network.

In an embodiment, the processors are configured to prefetch one or more of the content items of the second subset before the user requests to access the UI unit, in response to assessing that the one or more of the content items can be prefetched using less than a predefined amount of a given resource. In another embodiment, the processors are configured to prefetch one or more of the content items of the second subset before the user requests to access the UI unit, in response to assessing that a likelihood of the user requesting to access the UI unit is higher than a predefined threshold.

In a disclosed embodiment, the processors are configured to assign one or more of the content items in the UI unit, based on the rendering characteristics, to a third subset of content items that are to be fetched using a predefined Just-In-Time (JIT) mode. In another embodiment, the processors are configured to prefetch the content items in the first subset using a guaranteed prefetching mode, and to assign one or more of the content items in the UI unit, based on the rendering characteristics, to a third subset of content items that are to be prefetched using a best-effort prefetching mode.

In yet another embodiment, the processors are configured to assign one or more of the content items in the UI unit, based on the rendering characteristics, to a third subset of content items that are to be prefetched selectively depending on one or more predefined factors. In still another embodiment, based on the rendering characteristics, the processors are configured to (i) assign to the first subset one or more content items that are to be prefetched to a cache of the user device and to be preloaded, (ii) assign to the second subset one or more content items that are to not be prefetched to the cache and not to be preloaded, and (iii) assign to a third subset one or more content items that are to be prefetched to the cache, but not to be preloaded.

There is also provided, in accordance with an embodiment of the present invention, an apparatus for content delivery including a network interface and a processor. The network interface is configured for communicating over a communication network. The one or more processors are configured to identify rendering characteristics of a plurality of content items that are to be displayed together as a User-Interface (UI) unit on a user device, to assign the plurality of content items, based on the rendering characteristics, to (i) a first subset including one or more content items that are to be preloaded to the user device, and (ii) a second subset including one or more content items that are not to be preloaded to the user device, to preload the content items of the first subset irrespective of any request from a user of the user device to access the UI unit, to load the content items of the second subset only in response to a request from the user to access the UI unit, and to present the UI unit to the user, including both the preloaded first subset and the loaded second subset.

There is further provided, in accordance with an embodiment of the present invention, a method for content delivery, including identifying rendering characteristics of a plurality of content items that are to be displayed together as a User-Interface (UI) unit on a user device. Based on the rendering characteristics, the plurality of content items is assigned to (i) a first subset including one or more content items that are to be prefetched to the user device over a communication network, and (ii) a second subset including one or more content items that are not to be prefetched to the user device. The content items of the first subset are prefetched irrespective of any request from a user of the user device to access the UI unit. The content items of the second subset are fetched over the communication network only in response to a request from the user to access the UI unit. The UI unit is presented to the user, including both the prefetched first subset and the fetched second subset.

There is additionally provided, in accordance with an embodiment of the present invention, a method for content delivery, including identifying rendering characteristics of a plurality of content items that are to be displayed together as a User-Interface (UI) unit on a user device. Based on the rendering characteristics, the plurality of content items is assigned to (i) a first subset including one or more content items that are to be preloaded to the user device over a communication network, and (ii) a second subset including one or more content items that are not to be preloaded to the user device. The content items of the first subset are preloaded irrespective of any request from a user of the user device to access the UI unit. The content items of the second subset are loaded only in response to a request from the user to access the UI unit. The UI unit is presented to the user, including both the preloaded first subset and the loaded second subset.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for prefetching content to user devices in communication networks. In some disclosed embodiments, a system comprises a user device that consumes content items from one or more content sources over a communication network. One or more processors in the system, in the user device and/or on the network side, prefetch at least some of the content items to the user device in order to reduce delays and enhance user experience.

A simple and naïve prefetching policy is to prefetch as much content as possible, e.g., to the extent that is enabled by the user device's cache size and communication bandwidth. In many practical cases, however, unconstrained prefetching might in fact degrade performance and user experience. For example, prefetching operations incur additional data transfer and consume additional electrical power in the user device. Typically, not all prefetched content items will eventually be requested by the user, and therefore the additional data transfer and power consumption may be wasted. This waste may have considerable impact on the user, e.g., in battery-powered user devices and/or user devices having limited data consumption allowance.

In some embodiments, the processors eliminate or reduce the degradation in performance and user experience, by adaptively setting an upper limit on the extent of content prefetching to the user device. In these embodiments, the processors estimate the data usage level and/or power usage level of the user device, and set the limit based on the estimated usage level. The rationale behind this solution is that "heavy users," whose user devices consume large amounts of power and/or data, are typically more tolerant to the additional power and data overhead incurred by prefetching. "Light users," whose user devices consume less power and/or data, are more likely to be sensitive to additional power and data overhead. Several variations and example prefetching policies of this sort are described herein.

In other embodiments, the processors specify which content items to prefetch to a user device based on rendering characteristics, i.e., depending on how the content items are to be rendered on the user device screen. The rationale behind this technique is to give preference to prefetching of content items that have considerable impact to the way the content is (at least initially) displayed to the user.

Rendering characteristics may comprise, for example, whether the content items comprise text, image or video, and/or the rendering order of the content items. Some embodiments relate to prefetching of composite content items, such as Web pages or application ("app") feeds. Such composite content items typically comprise multiple content components, such as text, images, videos and scripts, which are rendered on the user-device screen in order to display the complete composite content item. In some embodiments, the processors specify the extent of prefetching, and select which content components to prefetch, based on the rendering characteristics of the content components. For example, the processors may prefetch only the textual components and not the graphical components of the composite content item, or prefetch only the content components that are initially visible to the user. Several variations and example prefetching policies of this kind are described herein, as well.

Although the embodiments described herein refer mainly to prefetching, the disclosed techniques are applicable to various other types of preloading, e.g., pre-rendering. In the present context, the term "preloading" refers to any scheme that makes content available for immediate display in the user device. Preloading operations may comprise, for example, loading code and/or content of an app into RAM, running code of an app in the background at the user device, and/or pre-rendering content items in the background at the user device. Prefetching is thus viewed as a special case of preloading. Any of the techniques described herein in the context of prefetching can also be applied to pre-rendering or to any other kind of preloading operation.

System Description

Figure 1:
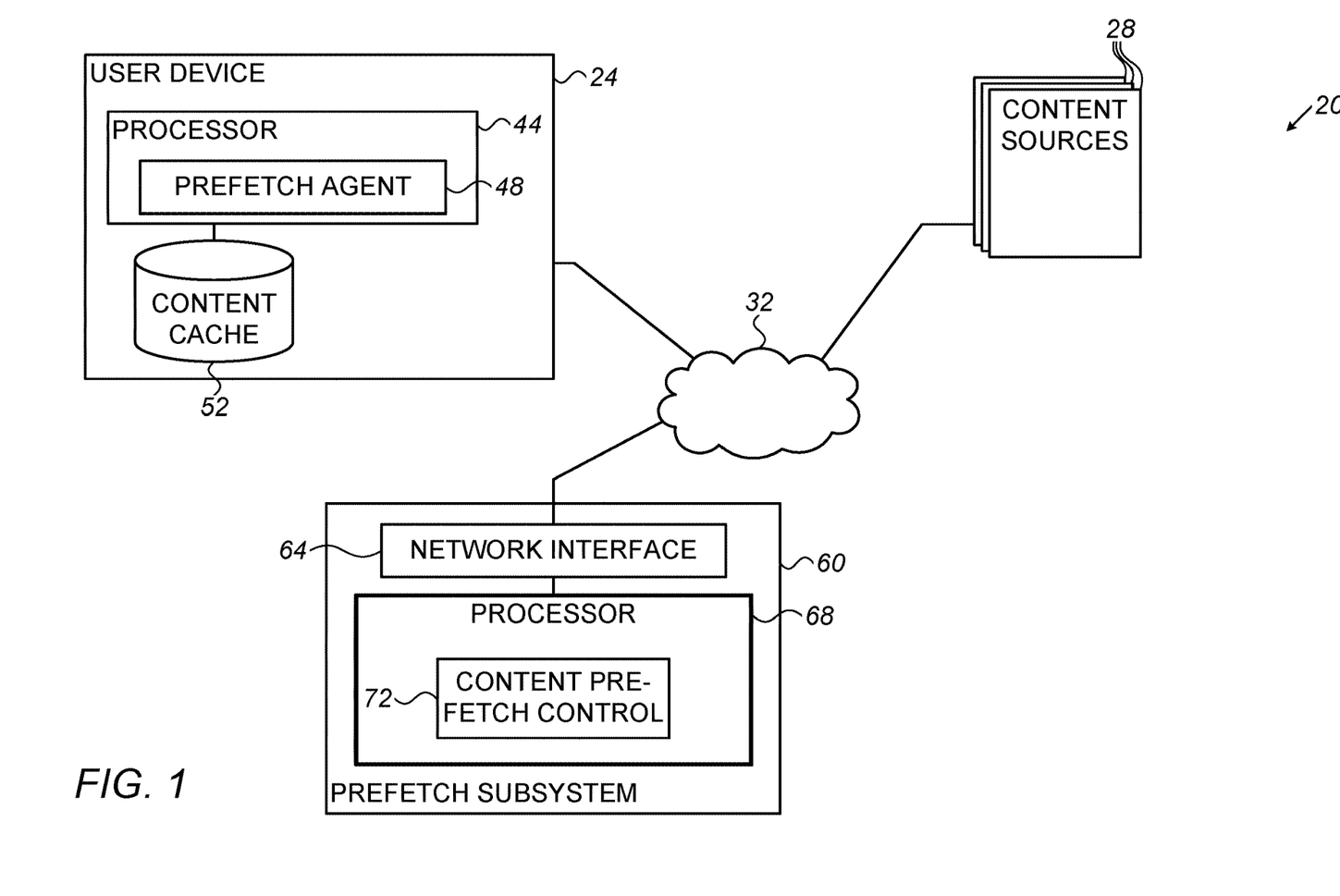
FIG. 1 is a block diagram that schematically illustrates a content delivery system, in accordance with an embodiment of the present invention.

FIG. 1 is a block diagram that schematically illustrates a content delivery system 20, in accordance with an embodiment of the present invention. The configuration of system 20 is one example configuration. Several alternative configurations are described further below.

System 20 comprises a user device 24 that accesses and consumes content items provided by one or more content sources 28 over a network 32. Device 24 may comprise any suitable wireless or wireline device, such as, for example, a cellular phone or smartphone, a wireless-enabled laptop or tablet computer, a desktop personal computer, or any other suitable type of user device that is capable of communicating over a network and presenting content to a user. User device 24 may consume content using any suitable software, e.g., a browser or dedicated application. The figure shows a single user device 24 for the sake of clarity. Real-life systems typically comprise a large number of user devices of various kinds.

Network 32 may comprise, for example a Wide Area Network (WAN) such as the Internet, a Local Area Network (LAN), a wireless network such as a cellular network or Wireless LAN (WLAN), or any other suitable network or combination of networks.

Content sources 28 may comprise, for example, Web content servers, or any other suitable sources of content. The disclosed techniques can be used with any suitable types of content items, such as, for example, Web pages, audio or video clips, html files, java scripts and/or CSS files, to name just a few examples.

In some embodiments, system 20 performs prefetching of content items to user device 24. In the present example, user device 24 comprises a processor 44 that carries out the various processing tasks of the user device. Among other tasks, processor 44 runs a software component referred to as a prefetch agent 48, which handles prefetching of content items. In addition, user device 24 comprises a content cache 52 for caching prefetched content items. Cache 52 is typically managed by prefetch agent 48.

Typically, prefetch agent 48 receives prefetched content items and stores them in content cache 52. Prefetch agent 48 may intercept user requests to access content items, and determine whether a requested item already resides in the cache. If so, the prefetch agent may retrieve the reqvideuested content item from the content cache. Otherwise, the prefetch agent would typically retrieve the requested content item from content sources 28 over network 32. In an embodiment, prefetch agent 48 may also assist in tracking historical usage patterns, and other relevant data related to the user device, which can be used as inputs for specifying prefetch policies for content.

User device 24 typically also comprises a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory (not shown in the figure) that is used for storing relevant information, such as the applicable prefetch policy.

In the embodiment of FIG. 1, system 20 further comprises a prefetching subsystem 60 that performs the various content prefetching tasks on the network side.

Subsystem 60 comprises a network interface 64 for communicating over network 32, and a processor 68 that carries out the various processing tasks of the prefetching subsystem. In the present example, processor 68 runs a Content Prefetching Control unit (CPC) 72 that carries out content prefetching.

In an example embodiment, CPC 72 defines a prefetch policy, which specifies how content is to be prefetched to user device 24. For example, CPC 72 may determine which content items are to be prefetched from content sources 28 to content cache 52, e.g., based on the likelihood that the user will request the content items. The CPC may determine the appropriate time for prefetching content items, e.g., based on a prediction of the time the user is expected to request them, and/or availability of communication resources. The CPC may determine how content items are to be delivered to cache 52, e.g., over a Wi-Fi or cellular connection. As yet another example, the CPC may determine the format with which content items are to be delivered to the user device, e.g., whether and how to perform compression or to deliver only changes for the case of content already prefetched (i.e., differential prefetch updates).

In various embodiments, as part of applying the prefetch policy, CPC 72 may estimate, for each content item, the likelihood that the user of user device 24 will request access to the content item. Such likelihood metrics can be sent to user device 24, and may be used by prefetch agent 48 in ranking prefetch priorities for the different content items. The likelihood estimation in CPC 72 may take into account various factors. Some factors may be user-related (e.g., gender, geographical location, interests, and/or recent and historical Internet activity). Other factors may be environment-related (e.g., time-of-day, road traffic conditions, weather, current events, and/or sporting occasions). Yet other factors may be content-related (e.g., content topic or category, content keywords, identity of the content source, and/or the current popularity or rating of the content).

In some embodiments, CPC 72 estimates the time the user is likely to access a content item in order to help determine the prefetch priorities of the various content items and/or the timing of the prefetch. These time estimates might be separately specified as part of the prefetch policy sent to the device, or they might be incorporated into likelihood metrics themselves. For example, a content item that is likely to be accessed within one hour might be given a higher likelihood metric than a content item that will not be needed for at least two hours.

Additionally or alternatively to the likelihood of the user accessing the content, other factors that CPC 72 may consider in specifying the prefetch policy may comprise power consumption considerations (e.g., preference to prefetch while a Wi-Fi connection or a strong cellular connection is available), transmission cost considerations (e.g., preference to lower-cost data transfer times), network congestion and server load considerations (e.g., preference to prefetch during off-peak traffic hours), and/or other user-related or network-related considerations.

Further additionally or alternatively, in specifying the prefetch policy, CPC 72 may associate certain times-of-day with respective prefetch priority levels. This association may be performed separately for different apps or content sources, or jointly for multiple apps or content sources. One example factor in determining the prefetch priority levels is the estimated likelihood of the user accessing the different apps or content sources during various times-of-day. Assigning a high priority to a prefetch operation typically translates to the prefetch operation being likely to occur (possibly conditioned on certain constraints or limitations).

Certain aspects of content prefetching, and content prefetching schemes that can be used by subsystem 60 and agent 48, are addressed in U.S. Patent Application Publication 2016/0021211, cited above. For example, CPC 72 may choose between various prefetching modes, e.g., a guaranteed prefetching mode and a best-effort prefetching mode. In the guaranteed prefetching mode, CPC 72 continuously tracks changes in content on content sources (e.g., at predefined tracking intervals) and ensures that content cache 52 in user device 24 is regularly updated by prefetching to be synchronized with the content sources (e.g., at predefined guaranteed-mode prefetching intervals). In the best-effort mode, the CPC typically performs prefetching only as feasible using the available resources. For example, in the best-effort mode, prefetching may be restricted to scenarios in which a particularly robust network connection exists, or limited to scenarios that do not involve a cellular connection. The guaranteed prefetching mode may be utilized during one or more time-of-day intervals in which the likelihood of a user accessing a content source has been predicted to be high. Other considerations that can affect the choice between the guaranteed and best-effort modes can be based on various prefetching policy considerations, e.g., power consumption, transmission cost, network congestion and/or server load. The choice of mode can also be made separately for different applications and/or content sources.

In some embodiments, CPC 72 regularly monitors content sources 28 and generates a "prefetch catalog"—a catalog of content items available for prefetching. Each content item is represented in the catalog by an identifier (ID) and a version number indication. The version numbers enable CPC 72 and/or prefetch agent 48 to determine, for example, whether a certain content item has changed relative to the version cached in cache 52 of user device 24. The catalog may also comprise the likelihood metrics described above, links or addresses from which the content items can be retrieved, and/or any other relevant information. The catalog is considered part of the prefetch policy, along with any other prefetch rules, strategies, thresholds or other policy matters defined by CPC 72.

The configurations of system 20 and its various elements shown in FIG. 1 are example configurations, which are chosen purely for the sake of conceptual clarity. In alternative embodiments, any other suitable configurations can be used. For example, the functions of prefetching subsystem 60 can be implemented using any desired number of processors, or even in a single processor. The various functions of subsystem 60 can be partitioned among the processors in any suitable way. In another embodiment, some or all of the functions of subsystem 60 may be performed by agent 48 in user device 24.

As another example, prefetch agent 48 may be implemented in a software module running on processor 44, in an application running on processor 44, in a Software Development Kit (SDK) embedded in an application running on processor 44, by the Operating System (OS) running on processor 44, or in any other suitable manner. In an embodiment, processor 44 may run a proxy server, which is controlled by prefetch agent 48 and is exposed to incoming and outgoing traffic. Further alternatively, the functionality of prefetch agent 48 can be implemented entirely on the network side without an agent on user device 24.

Generally, the functions of the different systems elements described herein (e.g., prefetch agent, content sources and elements of subsystem 60) can be partitioned in any other suitable way. Thus, in the context of the present patent application and in the claims, the disclosed techniques are carried out by one or more processors. The processors may reside in user device 24, and/or on the network side such as in subsystem 60 and/or in content sources 28.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Adjustment of Prefetching Activity Based on Data and/or Power Usage Levels

In many practical cases, excessive prefetching may degrade the performance of user device 24 and/or the user experience of its user. For example, when user device 24 is battery powered, e.g., a mobile phone, the additional power consumption incurred by prefetching operations may be significant. As another example, when user device 24 has a limited data transfer allowance, e.g., a limited monthly data plan, the additional data transfer overhead incurred by prefetching may drain the allowance too rapidly.

In such cases, it is desirable to set an upper limit on the extent of prefetching, so as to set a better trade-off between latency saving, data-transfer overhead and power-consumption overhead. Setting an upper limit typically means that the actual amount of prefetching to the user device underutilizes both the available space in cache 52 and the available bandwidth on the communication link of the user device.

In some embodiments, the processors in system 20 (e.g., processor 44 in user device 24 and/or processor 68 in prefetching subsystem 60) set this upper limit adaptively, based on the actual data and/or power usage of the user device. In these embodiments, a user device that normally receives large amounts of data and/or power (a "heavy user") will be allowed a high amount of prefetching, whereas a user device that uses only small amounts of data and/or power (a "light user") will be restricted to a low amount of prefetching. Such a policy makes sense because heavy users are typically more tolerant than light users to the additional power and data overhead incurred by prefetching.

Figure 2:
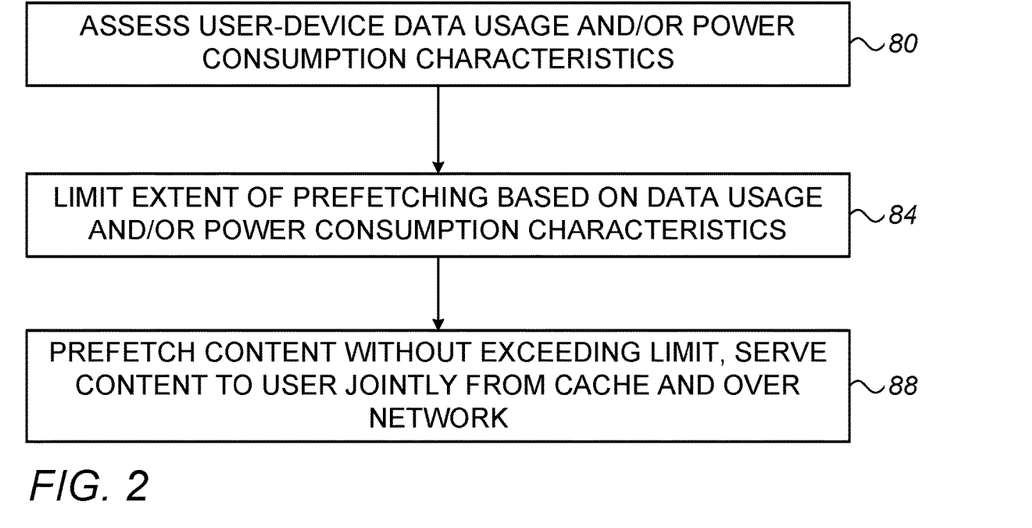
FIGS. 2-4 are flow charts that schematically illustrate methods for adaptive prefetching of content, in accordance with embodiments of the present invention.

FIG. 2 is a flow chart that schematically illustrates a method for adaptive prefetching of content, in accordance with an embodiment of the present invention. The method begins at a usage estimation step 80, with the processors assessing the power consumption characteristics and/or the data usage characteristics (e.g., the amount of received data) of user device 24 over time. Based on the assessed usage characteristics, the processors set an upper limit on the extent of prefetching permitted for the user device, at a limiting step 84. At a prefetching step 88, the processors serve content to the user device without exceeding the above-described prefetching limit. Typically, content is served jointly from cache 52 and over network 32, with some content items prefetched and served locally from the cache and other content items retrieved over the network.

In these embodiments, the processors will typically assign different upper limits on the amount of prefetching to different user devices having different data and/or power usage characteristics. For a given user device, the processors will typically adapt the upper limit over time if appropriate, to match changes that may occur in the data and/or power usage characteristics of the user device.

In some embodiments, the processors may consider additional factors in specifying the amount of prefetching to a given user device. In other words, in some embodiments the processors set the upper limit at least partially based on the data and/or power usage characteristics of the user device.

In some embodiments, the processors distinguish between data usage that impacts the user device's data allowance and data usage that does not impact the data allowance. For example, often users have a cellular data allowance, but not a Wi-Fi data allowance. In such a case, the processors may restrict prefetch activity over cellular networks as a function of the user's cellular data usage, but refrain from restricting prefetch activity over Wi-Fi as a function of the user's data usage (neither over cellular or over Wi-Fi).

In some embodiments, the processors distinguish between data usage over a first wireless network with a first data allowance and data usage over a second wireless network with a second data allowance. For example, in such a case, the processors may restrict prefetch activity over the first wireless network as a function of the user's data usage over the first wireless network, and the prefetch activity over the second wireless network might be restricted as a function of the user's data usage over the second wireless network.

In some embodiments, the processors estimate the data and/or power usage, and set the upper limit on prefetching, with respect to a particular application or content source. This feature enables the amount of prefetch to be optimized with finer granularity, e.g., allow more prefetching for a heavily-used application and less prefetching for a seldom-used application on the same user device.

Hybrid solutions are also possible. For example, the processors may estimate the data and/or power usage across all applications and content sources accessed by the user device, but set separate upper limits on prefetching for individual applications or content sources.

In some embodiments, the upper limit set on the amount of prefetch is part of the prefetch policy, which is provided to and applied by prefetch agent 48 in user device 24. In one embodiment, prefetch agent 48 estimates the data and/or power usage level, defines the upper limit on the amount of prefetching, and adjusts the prefetch policy received from CPC 72 to reflect the limit. In another embodiment, prefetch agent 48 estimates the data and/or power usage level and reports the results to CPC 72. The CPC in turn sets the upper limit and includes it in the prefetch policy provided to the prefetch agent.

In various embodiments, prefetch agent 48 may measure the data and/or power usage level over various time intervals. In an example embodiment, agent 48 measures the usage level over the most-recent time interval of a given length (e.g., five minutes, an hour, or other suitable duration). In other embodiments agent 48 may measure the daily, weekly or monthly data and/or power usage level. In an embodiment, agent 48 is aware of the billing cycle of the user device, e.g., of the date in which the monthly data-transfer allowance is reset. This date can also be taken into account in setting the upper limit on prefetching. In a further embodiment, the date at which the monthly data-transfer allowance is reset is predicted at the device (or in the cloud and passed to the device). For estimating the power usage level, agent 48 may track the power usage since the last time the user device battery was recharged.

In some embodiments, the processors also consider the type of user device in setting the upper limit. For example, setting of the upper limit may be enabled only for battery-operated or data-limited user devices.

Additionally or alternatively, the processors may take into consideration the present status of the user device in setting the upper limit on prefetch activity. For example, setting the upper limit may be enabled only when the user-device battery charge level drops below a certain threshold, or when the remaining data-transfer allowance drops below a certain threshold. Another factor that can be used in setting the upper limit is the time remaining until the data-transfer allowance is reset. Yet another factor that can be used in setting the upper limit is the time remaining until the device battery is predicted to be recharged. For example, if the battery is expected to soon be recharged, the percentage of power usage allowed for prefetch may increase. Similarly, whether the device is currently be recharged or the past frequency of device recharge are also factors that can be considered in setting the upper limit on prefetch activity.

In some embodiments, the processors in system 20 (e.g., processor 44 in user device 24 and/or processor 68 in prefetching subsystem 60) set the prefetch activity upper limit adaptively, based on the monetary cost incurred by the user device (at least in part). For example, a prefetch cost limit of 10% of overall data cost might be set for the user. In these embodiments, the data cost may be known or estimated at the device for one or more wireless networks.

The embodiments described above referred mainly to prefetching of content from content sources 28. The disclosed technique, however, is not limited to prefetching of content and can be used for management of prefetching of other information. One example is prefetching of advertisements ("ads"), as addressed, for example, in U.S. Patent Application Publication 2016/0063577, U.S. patent application Ser. No. 15/369,923, filed Dec. 6, 2016, and U.S. patent application Ser. No. 15/390,503, filed Dec. 25, 2016, which are all assigned to the assignee of the present patent application and whose disclosure are incorporated herein by reference.

Adjustment of Prefetching Activity Based on Rendering Characteristics

In other embodiments, the processors in system 20 (e.g., processor 44 in user device 24 and/or processor 68 in prefetching subsystem 60) specify which content items to prefetch to user device 24 based on rendering characteristics, i.e., depending on how the content items are to be rendered on the user device screen. Typically, preference is given to prefetching of content items that have considerable impact to the way the content is (at least initially) rendered and displayed to the user.

Rendering of content items often relates to prefetching of composite content items, such as Web pages or application ("app") feeds (the first page of an app that provides access to additional content). Such composite content items typically comprise multiple content components, such as text, images, videos and scripts, which are rendered on the user-device screen in order to display the complete composite content item. In some embodiments, the processors specify the extent of prefetching, and select which content components to prefetch, based on the rendering characteristics of the content components within the composite content item.

Figure 3:
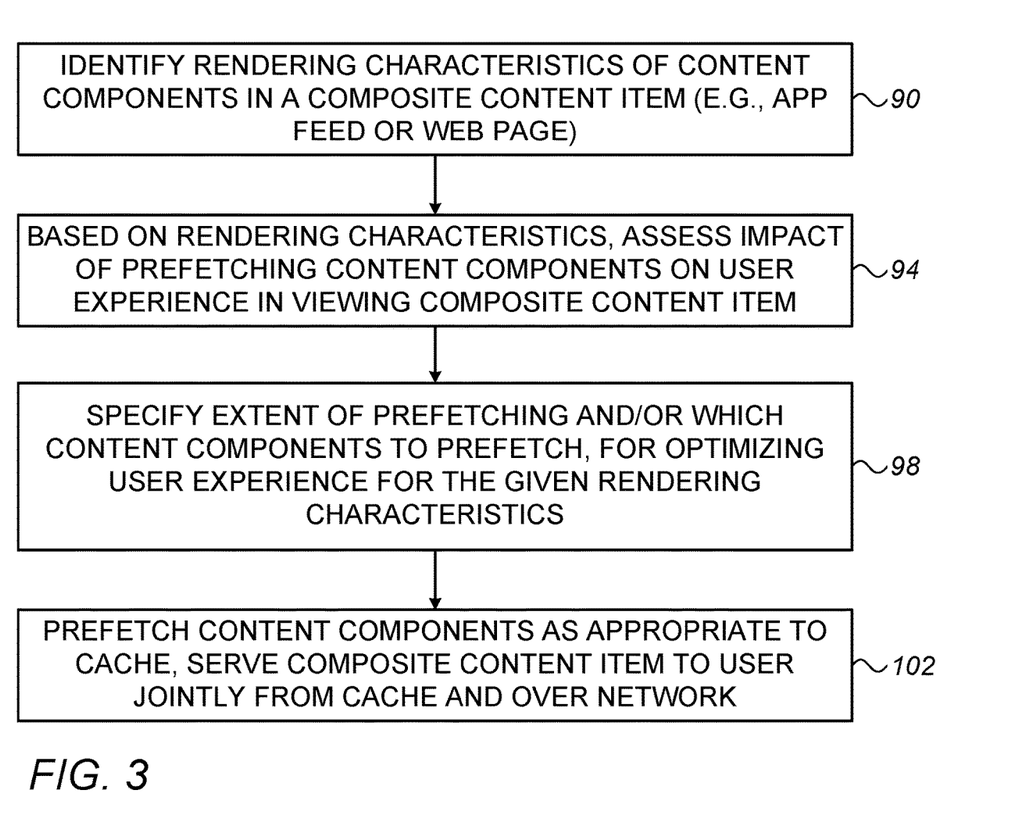

FIG. 3 is a flow chart that schematically illustrates a method for adaptive prefetching of content, in accordance with an embodiment of the present invention. The method begins with the processors identifying rendering characteristics of content components in a composite content item, at a rendering identification step 90. Based on the rendering characteristics, the processors assess the impact of prefetching various content components of the composite content item on the user experience, at an impact estimation step 94.

At a policy adjustment step 98, the processors adapt the prefetching policy (e.g., the extent of prefetching and/or which content components to prefetch) so as to optimize the user experience, given the rendering characteristics. At a prefetching step 102, the processors prefetch content components as appropriate over the network to cache 52, and serve the composite content item to the user device. Typically, the composite content item is served jointly from cache 52 and over network 32, with some content components prefetched and served locally from the cache and other content components retrieved over the network.

In various embodiments, the processors may take into account any suitable characteristic relating to the rendering of content items. One rendering characteristic may comprise, for example, whether a content item is textual or non-textual, e.g., whether the content item is textual or graphical (e.g., image or video). Textual content items may be given preference in prefetching over non-textual content items. In these embodiments, only textual content items are prefetched, at least initially. As a result, when the user accesses content, e.g., a Web page or app feed, the textual part is displayed immediately since it is served locally from cache 52. Images and other non-textual content items may be displayed with slightly longer latency as they may need to be retrieved over the network. This trade-off is advantageous in many cases.

In an example embodiment, the processors set the prefetch policy to give preference to prefetching, at least initially, configuration files that define the rendering structure of a composite content item and provide access to content components. Such files may comprise, for example, extensible markup language (XML) or Javascript object notation (JSON) files. These files are typically small, but on the other hand typically convey the complete description necessary for creating and displaying the app feed (e.g., text, page layout configuration and links to content components such as images and videos). Prefetching the configuration files to cache 52 enables the user device to display the basic app feed immediately when requested by the user, possibly initially without images. Since the configuration files are typically small, the data and power overhead of prefetching them is small.

In another example embodiment, the processors give preference to prefetching of hypertext transfer protocol (HTTP) files that define the structure of a Web page. HTTP files are usually small, and therefore incur small data and power overhead in prefetching. On the other hand such HTTP files enable the user device to display the basic Web page (at least initially without images) immediately when accessed by the user. Other content components of the Web page, e.g., images, may be displayed later when available.

Another rendering characteristic is the rendering order of the content items. In these embodiments, content items that are rendered and displayed first are given preference in prefetching over content items that are displayed later. For example, the processors may prefetch, at least initially, only the content components that are initially visible to the user (without scrolling). Other content components, which are visible only after the user scrolls, are given lower preference in prefetching or not prefetched at all. As another example, the processors may prefetch, at least initially, only the content components that are visible to the user with up to a predefined amount of scrolling.

In an example embodiment, for a given composite content item, the processors prefetch only (i) the configuration file (e.g., XML, JSON or HTTP file), (ii) the textual content components (possibly included in the configuration file), and (iii) one or more images that are listed first in the configuration file. The images listed first are also typically the images that are visible first on the user device screen (without the user scrolling). Therefore, this scheme typically provides a cost-effective trade-off between user experience and prefetching data/power overhead.

Additional aspects of prefetching and displaying certain content first, and additional content later, are addressed in U.S. Patent Application Publication 2017/0111465, entitled "Freshness-aware presentation of content in communication terminals," which is assigned to the assignee of the present patent application and whose disclosure is incorporated herein by reference.

In some cases, asynchronous rendering may be enabled or disabled selectively, e.g., for individual content items, individual composite content items, individual apps, or individual content sources. When asynchronous rendering is enabled, the user device is permitted to start displaying the composite content item in question even if not all content components are available. When asynchronous rendering is disabled, the user device is forced to wait until all content components are available, and only then display the complete composite content item.

In some embodiments, the processors carry out the disclosed technique (i.e., specify the prefetching policy at least partly based on rendering characteristics) only if asynchronous rendering is enabled. For example, if asynchronous rendering is disabled for a certain app feed, then it is likely not useful to prioritize prefetch based on whether the item is initially visible without scrolling. In some embodiments, the status of asynchronous rendering (i.e., enabled or disabled) is itself an additional rendering characteristic that is considered when determining prefetch policy and the amount of prefetch activity. For example, if asynchronous rendering is not enabled for an app feed, then the decision might be to either prefetch all content needed for the app feed or none of the content needed for the app feed.

In some cases, individual users may customize their feed or display such that the rendering order of content components differs from the default order specified in the configuration file of the composite content item. In some embodiments, the processors check whether the rendering order has been customized. If so, the processors specify the prefetch policy based on the customized order rather than the default order (or alternatively, based on both the customized order and the default order).

In various embodiments, the processors may adjust the prefetching policy based on various additional factors. Such factors may comprise, for example, the sizes of the various content items or content components, and the estimated likelihood that the user will actually access the various content items or content components. For example, if, according to the time-of-day and the user-device location, the likelihood of the user requesting a specific composite content item is estimated to be high, the processors may decide to prefetch some or all of the images of that content item in addition to the textual content. Yet another consideration may be any HTML "link" tags that support Just-In-Time prefetch associated with content, e.g., with attributes "prefetch", "prerender" or "DNS-prefetch". These HTML-embedded tags are directives from the content provider regarding content items to prefetch (the content itself or just the DNS information) or prerender.

Selective Prefetching of Components of a User Interface (UI) Unit

In some embodiments, one or more of the processors in system 20 (e.g., processor 68 in prefetch subsystem 60, processor 44 in user device 24, and/or a processor in a content source 28) identify a set of content items that together make-up a User Interface (UI) unit. The processors prefetch a selected subset of these content items before the user requests to access the UI unit. The remaining content items are not prefetched, but rather fetched in response to the user requesting to access the UI unit. The processors choose which content items to prefetch and which content items not to prefetch depending on the rendering characteristics of the content items, as will be explained and demonstrated below.

A UI unit may comprise, for example, a screen window, an Android activity, a Web page, a browser tab, a media player window, or any other suitable type of UI unit that is presented to a user. A UI unit is also referred to herein as a UI display. A UI unit typically comprises multiple content items. Content items in a UI unit may comprise, for example, textual content items, still images, audio clips, video clips, executable scripts, or any other suitable type of content items. In accordance with the definition of the UI unit, the content items are to be rendered on the display of user device 24 in a certain manner.

Figure 4:
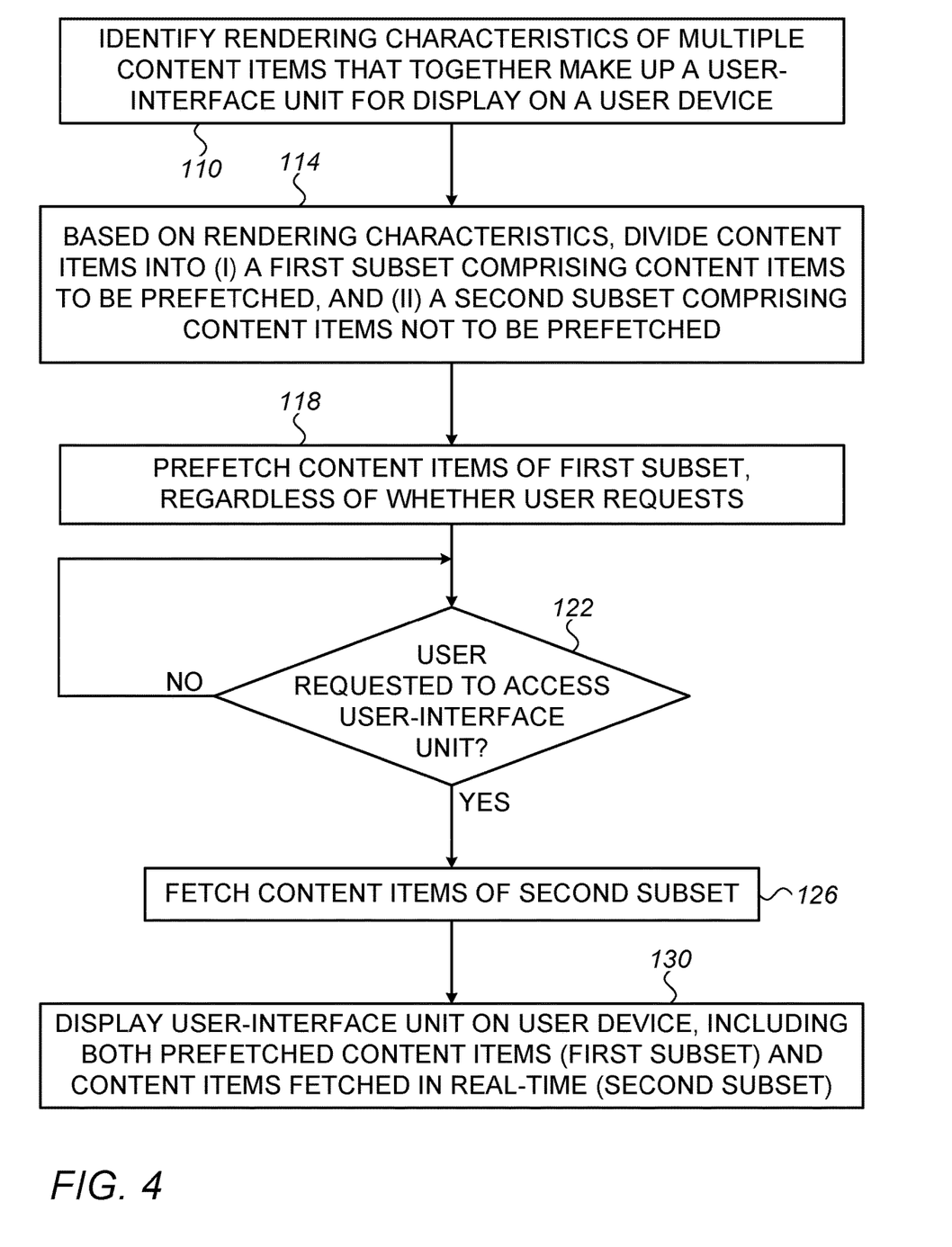

FIG. 4 is a flow chart that schematically illustrates a method for selective prefetching of content in a UI unit, in accordance with an embodiment of the present invention. The method begins with the processors identifying rendering characteristics of a set of multiple content items that together make up a UI unit for display on a user device 24, at a rendering characteristics identification step 110.

Based on the identified rendering characteristics, the processors divide the set of content items into two subsets, at a division step 114. The first subset comprises one or more content items that are to be prefetched to cache 52 of user device 24. The second subset comprises one or more content items that are not to be prefetched to the user device, i.e., to be fetched only in response to a request from the user to access the UI unit in question. Various examples of rendering characteristics and selection criteria are described below.

At a prefetching step 118, the processors prefetch the content items in the first subset to cache 52. At a request checking step 122, the processors check whether the user of user device 24 has requested to access (e.g., view) the UI unit. If so, the processors fetch the content items in the second subset, at a fetching step 126. At this point, the entire UI unit is available for display in user device 24. At a displaying step 130, the processors display the UI unit to the user, including both the prefetched content items (the content items belonging to the first subset) and the content items fetched in real-time (the content items belonging to the second subset).

In an embodiment, the processors decide whether or not to prefetch a certain content item depending on the location of the content item in the UI unit. For example, the processors may decide to prefetch the content items that are immediately visible to the user when presented on user device 24 as part of the UI unit. In this embodiment, content items that are not immediately visible are assigned to the second subset and fetched in real-time. In the present context, the term "visible" refers to content that is displayed "above the fold," i.e., without requiring the user to scroll in order to view it. In the present context, the term "location of a content item in the UI unit" is a static property of the content item, and does not depend on the specific portion of the UI unit that the user is currently viewing.

In another embodiment, the processors may assign a content item to the first subset, i.e., decide to prefetch a content item, depending on the location of the content item relative to the current display of the UI unit on user device 24. In the present context, the term "location of a content item relative to the current display" is a dynamic characteristic, and depends on the specific portion of the UI unit that the user is currently viewing. In an example embodiment, the processors prefetch content items that are currently visible on the user device screen, according to the current display. Other content items, which are not currently visible according to the current display, are not prefetched but rather fetched in real time.

In the two examples above, the rendering characteristics are binary, e.g., distinguish between content that is "visible" or "not visible." In some embodiments, the processors decide whether or not to prefetch a certain content item based on a soft "visibility metric" that quantifies the "distance from visibility" of the content item. The visibility metric is indicative of the amount of user actions and/or time needed at the user device in order to make the content item in question visible to the user. The processors may use various kinds of soft visibility metrics. Several non-limiting examples of visibility metrics comprise the following:

- Visibility metrics derived from the location of the content item within the UI unit. For example, a content item that is visible on a Web page without scrolling may be assigned a higher visibility metric, while a content item that is not visible without scrolling may be given a lower visibility metric. An another example, a content item that is visible in less than a predefined amount of scrolling may be assigned a high visibility metric, while a content item requiring more than the predefined amount of scrolling to be viewed may be assigned a low metric.
- Visibility metrics derived from the level of accessibility of the content item within the current display (the currently displayed portion) of the UI unit. For example, a content item that is visible to the user on the current display may be assigned a high visibility metric, and vice versa (i.e., content that is not visible to the user on the current display may be assigned a low visibility metric). As another example, a content item that can be made visible from the current display with less than a predefined amount of scrolling may be assigned a high visibility metric. A content item that requires more than the predefined amount of scrolling to be made visible (starting from the current display) may be assigned a low visibility metric.

Visibility metrics derived from the number of user actions, starting from the current display until the content item is accessible. For example, a content item that can become visible from the current display with less than a predefined amount of user actions may be assigned a high visibility metric, and vice versa. In this context, user actions may comprise, for example, clicks on hyperlinks, checking of check-boxes, scrolls, drop-down menu selections, or any other suitable actions. Note that the term "accessible" in the present context refers to both (i) content that is visible through scrolling, and (ii) link to the content being visible through scrolling. In other words, visibility metrics for content items may be based on the visibility metric defined for the link to the content, in a similar way that it is defined for the actual content itself. Moreover, the visibility metric may comprise a combination of the scrolls and the user click actions necessary to access the content.

Visibility metrics derived from the time duration that elapses until the content item causes a change in the UI, e.g., until the content item becomes visible. For example, a content item that can become visible within a short amount of time (e.g., below a predefined threshold) may be assigned a high visibility metric, and vice versa. In an example embodiment, content that is available near the beginning of a video or audio file (or e.g., contained within one of the first HLS frames of the video) can be assigned a high visibility metric, as opposed to content located later in the file. In another embodiment, content that is available following a click that usually responds in less than ten seconds (due to app processing, not network latency) can be assigned a high visibility metric, as opposed to content that becomes available after clicks that are slower to respond. The visibility metric may also be defined as some function of the amount of time until the content becomes accessible. Another example is a content item that is scheduled to change the UI at certain predefined times.

Visibility metrics relative to a predefined starting point. An example starting point is a launcher of an application ("app"). For example, content that is available after one user action (e.g., click) from the launcher can be assigned a high visibility metric, whereas content that requires a larger number of user actions from the launcher may be assigned a lower metric. As another example, content that is available from the Home screen of the launcher (e.g., by clicking on an app icon available from the Home screen) might be assigned a higher visibility metric than content that is available from other launcher screens (e.g., by clicking on an app icon after scrolling to one of the other launcher screens). Another example starting point is the landing page of an app (including, for example, a home screen of a browser). For example, content that is available from the landing page without any user actions may be assigned a high visibility metric, and vice versa.

Visibility metrics based on combinations of the above metrics. For example, content that is available on the landing page of an app without scrolling may be assigned a high visibility metric, and vice versa. As another example, the first three HLS frames of video content that is available from a landing page of an app may be assigned a high visibility metric, and vice versa.

The list above is given purely by way of example. In alternative embodiments, any other suitable visibility metric can be used. For example, any number of visibility metrics (described above or otherwise) can be combined in any manner and used as a visibility metric. As another example, the visibility metric may be formulated as a distance metric, in which smaller values indicate content items closer to visibility, and higher values correspond to content items requiring more time and/or user action to be viewed.

In an embodiment, a content item in the UI unit is a video link, i.e., a hyperlink leading to a video. The visibility metrics above, e.g., location within the current display, may apply to the location of such a video link in the UI unit.

Another example of a rendering characteristic is whether the content item loads synchronously or asynchronously. In an embodiment, if a content item loads asynchronously, the processors may decide not to prefetch it. If a content item loads synchronously, the processors may decide to prefetch.

Yet another example of a rendering characteristic is the time duration that elapses until the content item causes a change in the UI, e.g., until the content item becomes visible or accessible. This rendering characteristic may be used additionally or alternatively to (and independently of) the above-described visibility metric that is based on such time duration.

In some embodiments, the processors decide whether to assign a content item to the first or second subset (i.e., whether or not to prefetch a content item) depending on the rate at which updates are made to the content item on content source 28. In other words, the rate at which updates are made to a content item may be considered a rendering characteristic of the content item. The rationale behind this criterion is that a frequently-updated content item, if prefetched, is more likely to be found invalid (not fresh) when actually requested by the user. Thus, in an example embodiment, the processors assign to the first subset (i.e., prefetch) content items that change at a rate slower than a threshold T1. Additionally or alternatively, the processors may assign to the second subset (i.e., do not prefetch) content items that change at a rate faster than a threshold T2. Thresholds T1 and T2 typically differ from one another, but not necessarily. In an embodiment, when the metric is between T1 and T2, the processors decide whether to assign the content item to the first subset or to the second subset based on additional factors, e.g., another rendering characteristic or a visibility metric.

In some embodiments, the processors decide whether to assign a content item to the first or second subset (i.e., whether or not to prefetch a content item) depending on the impact of the content item on the user experience in viewing the UI unit. For example, certain content items that change over time, e.g., counter values, may not be updated immediately if deemed unimportant to the overall user experience.

In some embodiments, when prefetching the content items of the first subset (step 118), the processors at least partially pre-render the portion of the UI unit associated with the prefetched content items. In the present context, the term "pre-rendering" refers to rendering content in the background before the user requests to access the content. In other words, the UI unit containing the content is rendered in the background (at least partially) before the user accesses it. Thus, when the user accesses the UI unit, the pre-rendered visual display is immediately switched to the foreground without the typical user-device processing required for rendering the display.

Typically, prefetching content items of the first subset (step 118) comprises both (i) prefetching new content items that do not currently exist in cache 52 of the user device, and (ii) prefetching updated versions of content items that already exist in cache 52.

In some embodiments, the processors begin to fetch the content items of the second subset over the network, only upon the user requesting to access the UI unit. As a result, the user is likely to experience a delay in viewing the UI unit, or at least parts of it. In alternative embodiments, the processors compensate for this delay, at least partially, by using a "Hit and Update" scheme. Consider a scenario in which, when the user requests to access the UI unit, the content items of the second subset happen to be present in cache 52 of user device 24, e.g., because the user has already viewed the UI unit in the past. There is no guarantee, however, that these content items are fresh (valid), i.e., that the versions of the content items caches in the user device are the most up-to-date versions.

In a "Hit and Update" scheme, the processors immediately present the UI unit to the user with the existing cached versions of the content items (even though one or more of the content items may not be fresh). In parallel, the processors check whether the versions being presented are the most up-to-date versions. If not, the processors fetch the up-to-date versions over the network, and update the UI unit to present the updated versions. In an embodiment, even if a certain content item is not found at all in cache 52, the processors still present the UI unit immediately, with some dummy placeholder content item instead of the missing content item. In parallel, the processors fetch the content item over the network and update the presented UI unit. Further aspects of "Hit and Update" schemes are addressed in U.S. Patent Application Publication 2017/0111465, cited above.

In some embodiments, even though content items of the second subset are not to be prefetched, the processors still prefetch these content items opportunistically, before the user requests to access the UI unit. In the present context, the term "opportunistically" means that the processors identify circumstances in which it is possible to prefetch content items with only a small investment in system resources (e.g., if the battery power or data-plan cost necessary for this prefetch operation are below a predefined amount).

For example, the processors may decide to prefetch content items of the second subset depending on factors such as:

- Modem activity (e.g., whether the modem of the user device is active anyhow for another purpose)
- Data-transfer status, e.g., depending on the amount of other data being transferred relative to the data transfer capacity available (i.e., relative to potential efficiencies achievable by coordinating the potential prefetch with other current data transfers taking place, including other prefetches).
- Wireless channel quality (e.g., when reception quality is exceptionally high).
- Network type (e.g., when a Wi-Fi connection is available, as opposed to a cellular connection)
- Network conditions (e.g., when experiencing high throughput or small latency).

In yet another example, the processors may decide to prefetch content items of the second subset in response to assessing that the likelihood that the user will request to access the UI unit exceeds some predefined threshold.

Additional Embodiments and Variations

In some embodiments, the processors generate visibility metrics for content items on the network side, e.g., in a cloud-based server such as prefetch subsystem 60. The server then sends the metrics to user device 24, e.g., as part of the prefetching policy (catalog) per content item. In another embodiment, the server may combine the visibility metric into other prefetch priority metrics recorded in the prefetch policy calculated in the cloud.

In some cases, one or more content items in the UI unit are not prefetched, because of their visibility metrics, but are still required for proper presentation of the UI unit. In some embodiments, the processors may fetch such content items over the network when they are needed or in close proximity to when they are needed. This sort of fetching is referred to herein as Just-In-Time (JIT) fetching, or a JIT mode. For example, if CPC 72 only prefetches images belonging to the visible part of an app feed, the remaining images may be JIT-fetched when the user enters the app and scrolls down. Alternatively, such images could be JIT-fetched when the user enters the app (even before scrolling down). In this manner, the remaining content items that were not prefetched and are still needed for proper content presentation can be JIT-fetched. Content items that can be JIT-fetched may comprise, for example, Java Scripts for the purpose of analytics reporting that have no effect on the displayed content but are still needed for proper operation of the full system.

In some embodiments, for a given UI unit, the processors of system 20 may define a third subset of content items for JIT fetching (in addition to the first subset of content items for prefetching and the second subset of content items not for prefetching). As for the first and second subsets, the processors might assign content items to the third subset based on their rendering characteristics.

In some embodiments, the processors assign the content items of a UI unit to the first, second and third subsets (prefetch, do not prefetch, JIT-fetch, respectively) depending on the visibility metrics of the content items. In an example embodiment, for two thresholds T1 and T2, if the visibility metric of a content item is above T2, the item is assigned to the first subset (items to be prefetched); if the visibility metric is below T1, the item is assigned to the second subset (items not to be prefetched); and if the visibility metric of a content item is between T1 and T2, the item is assigned to the third subset (items to be JIT-fetched).

Consider, for example, a feed of a certain app. In an embodiment, the portion of the feed that is immediately visible when clicking on an app (or visible with minimal scrolling) is prefetched ahead of time (before the user launches the app). The portion of the feed that is only visible after a large amount of scrolling is never prefetched ahead of time, and not even prefetched after the app is launched (or after the user navigates to the associated website). However, in some embodiments, the latter portion of the feed might be prefetched after a certain amount of user scrolling when the distance from visibility decreases sufficiently. The portion of the feed that is visible after a moderate amount of scrolling is handled using JIT fetch. In other words, this content is only prefetched after the user launches the app (or navigates to the associated website).

In some embodiments, the processors prefetch the content items in the first subset using the guaranteed prefetching mode, defined above. In addition, the processors define a third subset of content items that are to be prefetched using the best-effort prefetching mode. In an example embodiment, the processors assign the content items of a UI unit to the first, second and third subsets (prefetch using guaranteed prefetching, do not prefetch, prefetch using best-effort prefetching, respectively) depending on the visibility metrics of the content items. In an example embodiment, for two thresholds T1 and T2, if the visibility metric of a content item is above T2, the item is assigned to the first subset (items to be prefetched using guaranteed prefetching); if the visibility metric is below T1, the item is assigned to the second subset (items not to be prefetched); and if the visibility metric of a content item is between T1 and T2, the item is assigned to the third subset (items to be prefetched using best-effort prefetching).

In some embodiments, the processors define a third subset (in addition to the first subset of content items for prefetching and the second subset of content items not for prefetching) of content items that are to be prefetched selectively, based on one or more predefined factors. Such other factors may comprise, for example, other rendering characteristics, current modem status, current network conditions, current network type and/or likelihood of the user accessing the content items. The processors assign content items to the third subset based on their rendering characteristics. In an example embodiment, for two thresholds T1 and T2, if the visibility metric of a content item is above T2, the item is assigned to the first subset (items to be prefetched); if the visibility metric is below T1, the item is assigned to the second subset (items not to be prefetched); and if the visibility metric of a content item is between T1 and T2, the item is assigned to the third subset (items to be prefetched selectively, depending on other factors). In some embodiments, based on the other predefined factors, the processors may override the assignment to the first and second subsets. In some embodiments, the processors may modify one or both thresholds (T1 and/or T2) based on the other predefined factors.

In yet another embodiment, the processors assign to the first subset one or more content items that are to be prefetched to cache 52 of user device 24 and to be preloaded. The processors assign content items to the first subset based on rendering characteristics, e.g., visibility metric above a threshold T2. The processors in this embodiment assign to the second subset one or more content items that are to not be prefetched to cache 52, and not to be preloaded. This assignment is also based on rendering characteristics, e.g., visibility metric below a threshold T1. The processors assign to a third subset one or more content items that are to be prefetched to cache 52, but not to be preloaded. This assignment, as well, is based on rendering characteristics, e.g., visibility metric between T1 and T2.

In various embodiments, the processors may calculate the visibility metrics in several various ways. In an embodiment, the processors may receive metrics that were calculated manually by a human. In other embodiments the processors may calculate the visibility metrics automatically using image processing. In yet other embodiments the processors may calculate the visibility metrics using a crowd wisdom process, based on analyzing the URLs that many user devices requested. Since some users will not bother to scroll down an article, the minimal set of common URLs among all the users who viewed that article tends to be the list of visible resources. In an embodiment, the processors may assign the visibility metrics based on the amount of common URLs. Among the relevant article URLs, those that were reported by the least amount of users are at the largest distance from visibility, and vice versa. A similar technique can be used for video segments. Typically, all (or at least most) users see the beginning of the clip, but fewer users view the video in its entirety. Therefore, the processors may set the visibility metrics of the relevant video segments to be proportional to their rating (high rating means high visibility metric, low rating means low metric).

Another possible way for the processors to use crowd wisdom is based on analyzing the times of the various user clicks at the user device (i.e., the times at which the user requests the URLs). For example, the smaller the time lapse between the app launch (a feed request) and a subsequent content item click, the larger the visibility metric, and vice versa. The processors may analyze (e.g., average) these time differences over many users in order to estimate a visibility metric.

For Web-pages, the visibility metric may be calculated automatically using automated tools for analyzing HTML files. These tools typically determine the location of each resource in the final display. Similar automatic analysis can be applied to HLS or DASH video clips, by taking the location of the segment in the clip (e.g., from the clip's manifest file) as input to the metric calculation.

Any suitable combination of the above techniques can also be used for the visibility metric calculation.

In some embodiments, the processors may calculate the visibility metrics approximately (rather than exactly) or in a relative manner. For example, in one embodiment, an image that appears in an HTML file before some other resource (e.g., before another image) will get a higher visibility metric than the other resource, but the exact metric value need not be proportional to the exact position of this image and/or other resource. The exact calculation or measurement of how many scroll actions are needed to get to this specific image is not important in this case. As one concrete example of this technique, consider a prefetching system that always prefetches a single image per article. In such a case, the step of deciding which content to prefetch will typically search for the first image in the HTML file and prefetch that image (and not prefetch any other images).

In the terminology of the present disclosure, this is done by assigning a very high visibility metric to the first image (which may or may not be just an approximation to the exact visibility metric of that image) and a very small metric to all other images. Similarly, the visibility metric for each image in an article might be assigned according to the order they appear on the screen. So, the proposed technique covers cases where some rough visibility metric or relative visibility metric is utilized instead of the exact value. In an example embodiment, the processors assign to the images in the UI unit integer visibility metrics that decrease with the order of appearance of the images in the UI unit (e.g., 6, 5, 4, 3, 2, 1).

The embodiments described above refer mainly to adjusting the prefetch policy based on (i) data and/or power usage levels, and (ii) content rendering characteristics. In some embodiments, the processors adjust the prefetch policy based on both factors. For example, for a "heavy" data user, the processors may decide to prefetch all text and images associated with a certain composite content item. For a "light" data user, on the other hand, the processors may decide to prefetch only the text of the composite content item.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for content delivery, comprising:
a network interface for communicating over a communication network; and
one or more processors, configured to:
for a plurality of content items that are to be displayed together as a User-Interface (UI) unit on a user device, assess visibility metrics that are indicative of one or more of (i) respective time durations and (ii) respective amounts of user actions, needed to make the content items visible to a user of the user device, wherein the visibility metrics are assessed relative to one or more of (i) absolute locations of the content items in the UI unit, (ii) a portion of the UI unit that is currently displayed on a screen of the user device, (iii) a launcher of the UI unit, (iv) a home screen of the launcher, and (v) a landing page of the UI unit;
assign the visibility metrics to the content items as rendering characteristics;
based on the rendering characteristics, assign the plurality of content items to:
(i) a first subset comprising one or more content items that are to be prefetched to the user device over the communication network; and
(ii) a second subset comprising one or more content items that are not to be prefetched to the user device;
prefetch the content items of the first subset irrespective of any request from a user of the user device to access the UI unit, and fetch the content items of the second subset over the communication network in response to a request from the user to access the UI unit; and
present the UI unit to the user, including both the prefetched first subset and the fetched second subset.

2. The apparatus according to claim 1, wherein one or more of the visibility metrics are binary, and are indicative of whether or not the amount of the needed user actions is lower than a predefined threshold.

3. The apparatus according to claim 1, wherein the rendering characteristics further comprise rates at which updates are made to the content items.

4. The apparatus according to claim 1, wherein the processors are configured to pre-render a portion of the UI unit associated with the content items in the first subset.

5. The apparatus according to claim 1, wherein the processors are configured to (i) initially present the UI unit to the user without an up-to-date version of at least one content item in the second subset, then (ii) fetch the up-to-date version over the communication network, and then (iii) update the UI unit being presented to include the up-to-date version.

6. The apparatus according to claim 5, wherein the processors are configured to initially display a dummy placeholder content item in place of the up-to-date version.

7. The apparatus according to claim 1, wherein the processors are configured to present the UI unit to the user only after the content items of the second subset have been fetched over the communication network.

8. The apparatus according to claim 1, wherein the processors are configured to prefetch one or more of the content items of the second subset before the user requests to access the UI unit, in response to assessing that the one or more of the content items can be prefetched using less than a predefined amount of a given resource.

9. The apparatus according to claim 1, wherein the processors are configured to prefetch one or more of the content items of the second subset before the user requests to access the UI unit, in response to assessing that a likelihood of the user requesting to access the UI unit is higher than a predefined threshold.

10. The apparatus according to claim 1, wherein the processors are configured to:
assign the content items to the first subset by choosing one or more of the content items whose visibility metrics are in a first range;
assign the content items to the second subset by choosing one or more of the content items whose visibility metrics are in a second range, distinct from the second range; and
assign one or more of the content items in the UI unit, whose visibility metrics are in a third range, distinct from the first and second ranges, to a third subset of content items that are to be fetched using a predefined Just-In-Time (JIT) mode.

11. The apparatus according to claim 1, wherein the processors are configured to:
assign the content items to the first subset by choosing one or more of the content items whose visibility metrics are in a first range;
assign the content items to the second subset by choosing one or more of the content items whose visibility metrics are in a second range, distinct from the second range;
prefetch the content items in the first subset using a guaranteed prefetching mode, and;
assign one or more of the content items in the UI unit, whose visibility metrics are in a third range, distinct from the first and second ranges, to a third subset of content items that are to be prefetched using a best-effort prefetching mode.

12. The apparatus according to claim 1, wherein the processors are configured to:
assign the content items to the first subset by choosing one or more of the content items whose visibility metrics are in a first range;
assign the content items to the second subset by choosing one or more of the content items whose visibility metrics are in a second range, distinct from the second range; and
assign one or more of the content items in the UI unit, whose visibility metrics are in a third range, distinct from the first and second ranges, to a third subset of content items that are to be prefetched selectively depending on one or more predefined factors.

13. The apparatus according to claim 1, wherein the processors are configured to:
assign to the first subset one or more content items whose visibility metrics are in a first range, and designate the content items in the first subset to be both (i) prefetched to a cache of the user device, and (ii) made available for immediate display by loading code or content into RAM in the user device, running code in a background in the user device, or pre-rendering in the background in the user device;
assign to the second subset one or more content items whose visibility metrics are in a second range, distinct from the first range, and designate the content items in the first subset to not be prefetched to the cache and not to be made available for immediate display; and assign to a third subset one or more content items whose visibility metrics are in a third range, distinct from the first and second ranges, and designate the content items in the third subset to be prefetched to the cache, but not to be made available for immediate display.

14. An apparatus for content delivery, comprising:

a network interface for communicating over a communication network; and one or more processors, configured to:

for a plurality of content items that are to be displayed together as a User-Interface (UI) unit on a user device, assess visibility metrics that are indicative of one or more of (i) respective time durations and (ii) respective amounts of user actions, needed to make the content items visible to a user of the user device, wherein the visibility metrics are assessed relative to one or more of (i) absolute locations of the content items in the UI unit, (ii) a portion of the UI unit that is currently displayed on a screen of the user device, (iii) a launcher of the UI unit, (iv) a home screen of the launcher, and (v) a landing page of the UI unit;

assign the visibility metrics to the content items as rendering characteristics;

based on the rendering characteristics, assign the plurality of content items to:
  (i) a first subset comprising one or more content items that are to be preloaded to the user device; and
  (ii) a second subset comprising one or more content items that are not to be preloaded to the user device;

preload the content items of the first subset irrespective of any request from a user of the user device to access the UI unit, and load the content items of the second subset in response to a request from the user to access the UI unit; and present the UI unit to the user, including both the preloaded first subset and the loaded second subset.

15. A method for content delivery, comprising:

for a plurality of content items that are to be displayed together as a User-Interface (UI) unit on a user device, assessing visibility metrics that are indicative of one or more of (i) respective time durations and (ii) respective amounts of user actions, needed to make the content items visible to a user of the user device, including assessing the visibility metrics relative to one or more of (i) absolute locations of the content items in the UI unit, (ii) a portion of the UI unit that is currently displayed on a screen of the user device, (iii) a launcher of the UI unit, (iv) a home screen of the launcher, and (v) a landing page of the UI unit;

assigning the visibility metrics to the content items as rendering characteristics;

based on the rendering characteristics, assigning the plurality of content items to:
  (i) a first subset comprising one or more content items that are to be prefetched to the user device over a communication network; and
  (ii) a second subset comprising one or more content items that are not to be prefetched to the user device;

prefetching the content items of the first subset irrespective of any request from a user of the user device to access the UI unit, and fetching the content items of the second subset over the communication network in response to a request from the user to access the UI unit; and presenting the UI unit to the user, including both the prefetched first subset and the fetched second subset.

16. The method according to claim 15, wherein one or more of the visibility metrics are binary, and are indicative of whether or not the amount of the needed user actions is lower than a predefined threshold.

17. The method according to claim 15, wherein the rendering characteristics further comprise rates at which updates are made to the content items.

18. The method according to claim 15, and comprising pre-rendering a portion of the UI unit associated with the content items in the first subset.

19. The method according to claim 15, wherein presenting the UI unit comprises (i) initially presenting the UI unit to the user without an up-to-date version of at least one content item in the second subset, then (ii) fetching the up-to-date version over the communication network, and then (iii) updating the UI unit being presented to include the up-to-date version.

20. The method according to claim 19, wherein presenting the UI unit comprises initially displaying a dummy placeholder content item in place of the up-to-date version.

21. The method according to claim 15, wherein presenting the UI unit is performed only after the content items of the second subset have been fetched over the communication network.

22. The method according to claim 15, and comprising prefetching one or more of the content items of the second subset before the user requests to access the UI unit, in response to assessing that the one or more of the content items can be prefetched using less than a predefined amount of a given resource.

23. The method according to claim 15, and comprising prefetching one or more of the content items of the second subset before the user requests to access the UI unit, in response to assessing that a likelihood of the user requesting to access the UI unit is higher than a predefined threshold.

24. The method according to claim 15, wherein assigning the content items to the first subset comprises choosing one or more of the content items whose visibility metrics are in a first range;

wherein assigning the content items to the second subset comprises choosing one or more of the content items whose visibility metrics are in a second range, distinct from the second range;

and comprising assigning one or more of the content items in the UI unit, whose visibility metrics are in a third range, distinct from the first and second ranges, to a third subset of content items that are to be fetched using a predefined Just-In-Time (JIT) mode.

25. The method according to claim 15, wherein assigning the content items to the first subset comprises choosing one or more of the content items whose visibility metrics are in a first range;

wherein assigning the content items to the second subset comprises choosing one or more of the content items whose visibility metrics are in a second range, distinct from the second range;

wherein prefetching the content items in the first subset is performed using a guaranteed prefetching mode, and comprising assigning one or more of the content items in the UI unit, whose visibility metrics are in a third range, distinct from the first and second ranges, to a third subset of content items that are to be prefetched using a best-effort prefetching mode.

26. The method according to claim 15,
wherein assigning the content items to the first subset comprises choosing one or more of the content items whose visibility metrics are in a first range;
wherein assigning the content items to the second subset comprises choosing one or more of the content items whose visibility metrics are in a second range, distinct from the second range;
and comprising assigning one or more of the content items in the UI unit, whose visibility metrics are in a third range, distinct from the first and second ranges, to a third subset of content items that are to be prefetched selectively depending on one or more predefined factors.

27. The method according to claim 15, wherein assigning the content items comprises:
assigning to the first subset one or more content items whose visibility metrics are in a first range, and designating the content items in the first subset to be both (i) prefetched to a cache of the user device, and (ii) made available for immediate display by loading code or content into RAM in the user device, running code in a background in the user device, or pre-rendering in the background in the user device;
assigning to the second subset one or more content items whose visibility metrics are in a second range, distinct from the first range, and designating the content items in the second subset to not be prefetched to the cache and not to be made available for immediate display; and
assigning to a third subset one or more content items whose visibility metrics are in a third range, distinct from the first and second ranges, and designating the content items in the third subset to be prefetched to the cache, but not to be made available for immediate display.

28. A method for content delivery, comprising:
for a plurality of content items that are to be displayed together as a User-Interface (UI) unit on a user device, assessing visibility metrics that are indicative of one or more of (i) respective time durations and (ii) respective amounts of user actions, needed to make the content items visible to a user of the user device, including assessing the visibility metrics relative to one or more of (i) absolute locations of the content items in the UI unit, (ii) a portion of the UI unit that is currently displayed on a screen of the user device, (iii) a launcher of the UI unit, (iv) a home screen of the launcher, and (v) a landing page of the UI unit;
assigning the visibility metrics to the content items as rendering characteristics;
based on the rendering characteristics, assigning the plurality of content items to:
(i) a first subset comprising one or more content items that are to be preloaded to the user device; and
(ii) a second subset comprising one or more content items that are not to be preloaded to the user device;
preloading the content items of the first subset irrespective of any request from a user of the user device to access the UI unit, and loading the content items of the second subset over the communication network in response to a request from the user to access the UI unit; and
presenting the UI unit to the user, including both the preloaded first subset and the loaded second subset.

* * * * *